(12) United States Patent
Quast et al.

(10) Patent No.: US 8,903,714 B2
(45) Date of Patent: Dec. 2, 2014

(54) CONCEPT SEARCH AND SEMANTIC ANNOTATION FOR MOBILE MESSAGING

(75) Inventors: Holger Quast, Merelbeke (BE); Tomas Macek, Zizhov (CZ); Jan Curin, Nusle (CZ); Martin Labsky, Prague (CZ); Jan Kleindienst, Nove Straseci (CZ)

(73) Assignee: Nuance Communications, Inc., Burlington, MA (US)

( * ) Notice: Subject to any disclaimer, the term of this patent is extended or adjusted under 35 U.S.C. 154(b) by 412 days.

(21) Appl. No.: 13/332,752

(22) Filed: Dec. 21, 2011

(65) Prior Publication Data

US 2013/0166280 A1 Jun. 27, 2013

(51) Int. Cl.
*G10L 13/00* (2006.01)
(52) U.S. Cl.
USPC .................. 704/9; 704/260; 707/738
(58) Field of Classification Search
USPC ............................................................. 704/9
See application file for complete search history.

(56) References Cited

U.S. PATENT DOCUMENTS

| | | | |
|---|---|---|---|
| 7,178,099 B2 * | 2/2007 | Meyer et al. | 715/210 |
| 7,788,262 B1 * | 8/2010 | Shirwadkar | 707/737 |
| 2006/0161423 A1 * | 7/2006 | Scott et al. | 704/10 |
| 2006/0206816 A1 | 9/2006 | Nordenhake | 715/534 |
| 2008/0079753 A1 | 4/2008 | Victor et al. | 345/660 |
| 2012/0215540 A1 * | 8/2012 | Goktekin | 704/260 |
| 2012/0245934 A1 * | 9/2012 | Talwar et al. | 704/235 |
| 2013/0273976 A1 * | 10/2013 | Rao et al. | 455/563 |

FOREIGN PATENT DOCUMENTS

| | | |
|---|---|---|
| EP | 0180047 | 5/1986 |
| WO | WO 9935008 | 7/1999 |
| WO | WO 2009040643 A2 | 4/2009 |

OTHER PUBLICATIONS

European Patent Office, Officer Anne Dorpema, International Search Report and Written Opinion, PCT/US2011/037535, date of mailing Nov. 20, 2012, 6 pages.

* cited by examiner

*Primary Examiner* — Daniel D Abebe
(74) *Attorney, Agent, or Firm* — Holland & Knight LLP; Mark H. Whittenberger, Esq.

(57) ABSTRACT

A textual message processing system and method are described for use in a mobile environment. A user messaging application processes at least one user textual message during a user messaging session. A semantic annotation module identifies one or more semantically salient terms in the user textual message, and annotates the user textual message with annotation terms having a low semantic distance to the semantically salient terms. A user message history stores the annotated textual messages. The semantic annotation module may further annotate the user textual message with situational meta-data characterizing the user textual message. There may be a message search module for using one or more keywords to search the user message history including the annotation terms, and identifying as a search match any annotated textual messages within a semantic distance threshold of the one or more keywords.

18 Claims, 4 Drawing Sheets

IM record 201108081305A

Part 1 – Meta info
start time: *Aug 8, 2011, 15:00 CET.*
participants: *Holger (self), Tomas (started chat)*
navigation info: *location: Brussels, Belgium, speed: 15km/h, road: E40/R0, vehicle: Holger's_Car, destination: Merelbeke*

Part 2 – Discourse
T: *Hi Holger, it seems the annual robot convention in Prague is going to be postponed to November this year. Are you coming?*
H: *Hi Tomas, ah, that's a bummer, I can't make November, I'll be working at our Boston site then.*
T: *OK, sorry you won't be able to attend. Maybe next year .-) Cheers!*
H: *OK, bye*

Part 3 – Semantics
salient word n-best list:
 1. robot convention (0.875)
 2. - robot (0.735)
 3. Prague (0.684)
 4. - convention (0.582)
 5. Boston (...)
 6. November
 7. postponed (root: postpone)
 8. next year
 9. ...

1$^{st}$ level word field associations
    robot convention: [none found]
     - robot: automaton (0.74), machine (0.43), ...
    Prague: Praha (0.92), Czech Republic (0.53), beer (0.32), capital (0.28)
     - convention: meeting (0.84), conference (0.81), people (0.53), ...
    Boston: ...
    November: ...
    ...

*Fig. 3*

CONCEPT SEARCH AND SEMANTIC ANNOTATION FOR MOBILE MESSAGING

TECHNICAL FIELD

The present invention relates to natural language understanding technology, and more specifically to message annotation in a mobile messaging application.

BACKGROUND ART

Instant messaging (IM) has become part of everyday life and its users require IM availability in many different situations. IM is commonly mediated through a broad range of devices including computers, tablets, and cell phones. However, these devices are not very appropriate for in-car use. Their handling can require too much attention from the user, which results in dangerous driver distraction.

Of course, instant messaging is just one specific example of a more general class of textual message applications. Other specific examples of textual message applications include without limitation cell phone text messages, email, and/or social media messaging (e.g., Twitter, LinkedIn, Facebook etc.). The discussion that follows should be understood to apply broadly to this general class of textual message applications using the specific example of instant messaging.

Searching or browsing past messages—emails or instant messages, etc.—is a tedious task, especially if it has to be done in a hands-free, eyes free manner as while driving in a car. It is complicated to narrow the search results sufficiently and present to the user efficiently and safely. Searching by content requires entering a search term that needs to match exactly. If only the topic of the message session is known but not the actual keyword for the search, the message can't be retrieved. Say a message contains the word "automotive" but the search is defined for a key term "car", an explicit search wouldn't match. In addition, the results of searching by keywords often are too wide. To further filter results, it would be advantageous to be able to query by the situation in which it was written, e.g. "present all instant messages on topic 'car' that I dictated on my way from Merelbeke to Aachen".

In systems using automatic speech recognition, using an unspecific (factory) language model to capture the driver's message dictation wastes recognition accuracy potential; it doesn't model statistics specific to the user—his choice of topics and words—nor his current situation, e.g. when driving in the mountains in January, messages on winter sports are more likely than others.

SUMMARY

Embodiments of the present invention are directed to a textual message processing system and method for use in a mobile environment. A user messaging application processes user textual messages during a user messaging session. A semantic annotation module identifies semantically salient terms in the user textual message, and annotates the user textual message with annotation terms having a low semantic distance to the semantically salient terms. A user message history stores the annotated textual messages. The semantic annotation module may further annotate the user textual message with situational meta-data characterizing the user textual message. There may be a message search module for using one or more keywords to search the user message history including the annotation terms, and identifying as a search match any annotated textual messages within a semantic distance threshold of the one or more keywords.

Embodiments may also include a message search module for using keywords to search the user message history including the annotation terms, and identifying as a search match any annotated textual messages within a semantic distance threshold of the keywords. There may be a user interface for presenting the search match textual messages to a user with the annotation terms, for example, using a text-to-speech arrangement. The message search module may obtain the keywords based on a hands-free, eyes-free user interface such as would be appropriate in an automobile.

The situational meta-data may include time data, location data, activity data, and/or user-specific terms associated with the user textual message. And the user textual message may include automatic speech recognition text, email text, and/or instant messaging text. There also may be a speech recognition language model adapted to the annotated textual messages in the user message history.

BRIEF DESCRIPTION OF THE DRAWINGS

FIG. 3 shows an example of a semantically annotated textual message.

DETAILED DESCRIPTION

Embodiments of the present invention are directed to a textual message processing arrangement for use in a mobile environment that provides text messaging functionality (e.g., IM) with minimized driver distraction using a speech interaction or speech in combination with other modalities. More specifically, the discussion presented here involves speech input/output for automotive messaging, which integrates textual message applications such as cell phone text messages, instant messaging, email, and/or social media messaging (e.g., Twitter, LinkedIn, Facebook etc.) and other electronic components into a single system and human-machine interface. Message history and the associated textual messages are enriched with situational meta-data and semantic field annotation to enable user searching of past messages based on keywords in the chat history and also words with similar meaning or for route information. This helps extend the reach of instant messaging into the automotive environment. Semantically annotated message history with salient words, semantic word field description, and description of driver situation context enables additional system functionality such as concept search, situation-aware search, message summarization, and improved language modeling.

Figure 1:
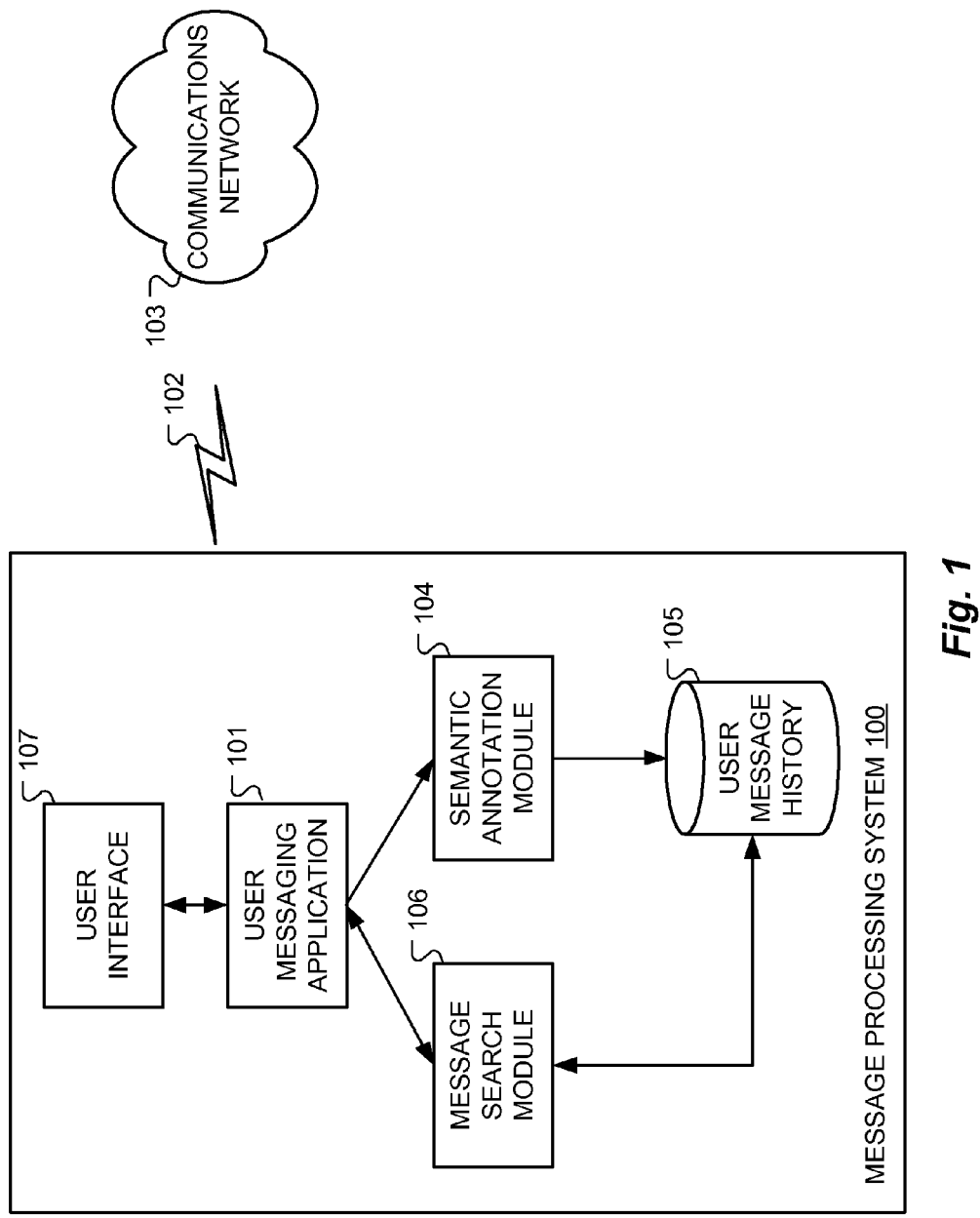
FIG. 1 shows a textual message processing system according to one embodiment of the present invention.
Figure 2:
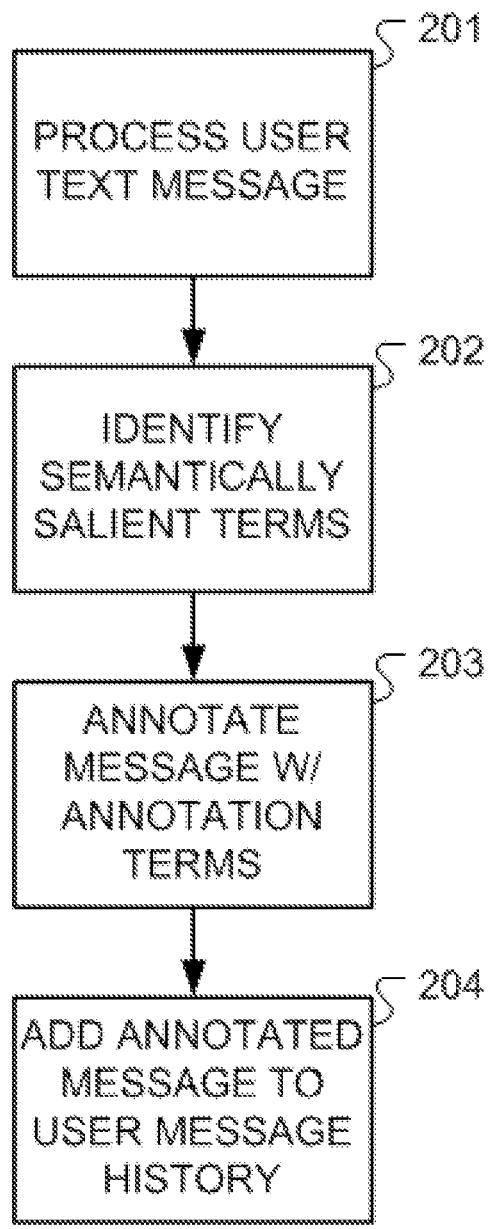
FIG. 2 shows various functional steps in semantic annotation of textual messages according to an embodiment.

FIG. 1 shows an example of a textual message processing system 100 and FIG. 2 shows various functional steps in semantic annotation of textual messages according to one embodiment of the present invention. If the textual message processing system 100 can be used by more than one user, it initially determines the identity of the user (e.g., by voice print, specific car key, cell phone ID, face detection, voice print, weight of driver, button press, etc.). Alternatively, simple switching of user identity can be done by a voice command which can be combined with voice identification.

Then during a user messaging session, a user messaging application 101 processes at least one user textual message, step 201, received by wireless link 102 from a communications network 103 connected to other text messaging systems.

A semantic annotation module 104 identifies one or more semantically salient terms, step 202, in each user textual message, and annotates the message with annotation terms having a low semantic distance to the semantically salient terms, step 203. A user message history 105 stores the annotated textual messages. The semantic annotation module 104 may further annotate the user textual message with situational meta-data characterizing the user textual message.

FIG. 3 shows an example of a semantically annotated textual message. Part 1 contains the situational meta-data concerning one specific user messaging session. This may include system state information and data from the car's navigation and/or electronic entertainment system. In this case, the situational meta-data includes the date and time of the session, the session participants, vehicle location, destination, and existing vehicular and traffic conditions. Part 2 of the annotated textual message includes the actual text of the messaging session. Data objects can contain the actual text and the situational meta-data, as well as additional ASR hypotheses (if the text was dictated). Part 3 contains the semantic annotation which includes a salient word n-best list of semantically salient terms contained in the text and a list of first level word field associations of terms having a low semantic distance to the terms in the salient word n-best list. This semantic information is an indicator of the meaning content of a given messaging session.

The semantic annotation module 104 can implement Part 3 using a ranked list of salient words and their saliency value. Saliency can be computed with various known techniques such as term frequency-inverse document frequency (TF-IDF) or information gain. From the salient words, the semantic annotation module 104 can compute associated words that further describe the domain of the messaging session. Such associated words can be synonyms and other terms in the same domain. For example, a salient word "barbecue" can have associated words such as "grill", "sausage", "hot", "eat" and so forth, which would represent words of distance 1. From these initial associated words, the semantic annotation module 104 can derive other associated words. For example, "sausage"→"hot dog", "mustard", "boil", etc. These are associated words of distance 2. For the semantic part of the annotated user message history 105, associated words of distance 1 or 1&2 may be most practical. The semantic annotation module 104 can store the annotating associated words in the user message history 105 or compute them when a function (language modeling, search, or summarization) needs them. Normalization techniques such as stemming and/or looking up infinitive verb forms can be used to derive the root form of words to allow easier comparison.

Figure 4:
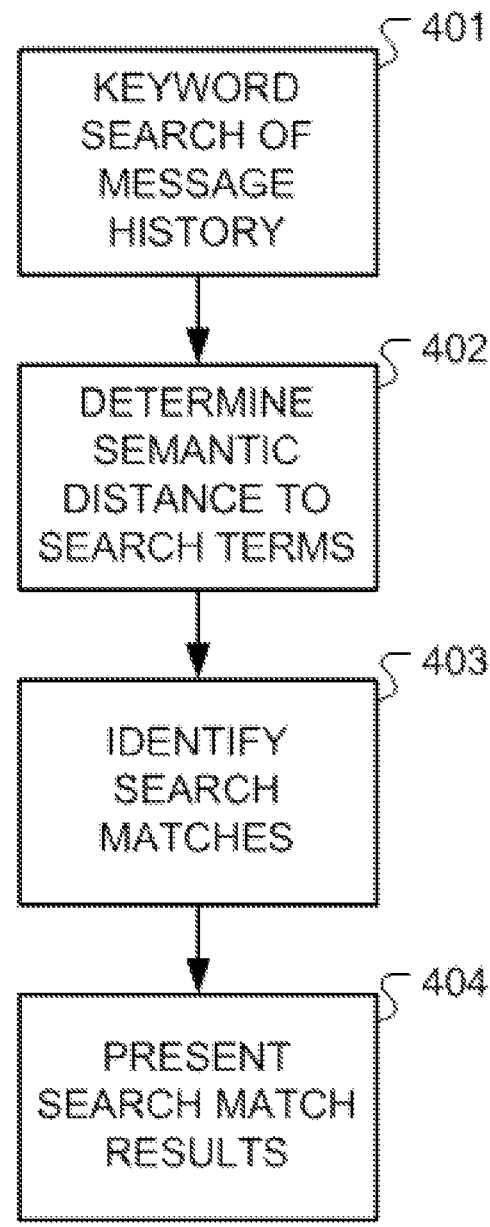
FIG. 4 shows various logical steps in searching a semantically annotated textual message database.

FIG. 4 shows various logical steps in searching a semantically annotated textual message database. A message search module 106 enables the use of one or more keywords to search the user message history 105 including the annotation terms, step 401, based on an evaluation of the semantic distances of the search keyword to the terms in each specific annotated chat history, step 402. This semantic distance evaluation can be based on determining a binary value (exact match—no exact match, i.e. the search term is exactly the same as one of the terms in the message history, possibly after normalization of terms), semantic distance computation value (how related are the meanings between search terms and semantic terms in chat history), and/or based on text or phonetic similarity (e.g. with Levenshtein distances to increase robustness if a term was misunderstood or normalization didn't find the right root forms). The message search module 106 identifies any annotated textual messages within a semantic distance threshold of the one or more keywords as search match, step 403, and presents them over a user interface 107, step 404, for example, by synthesized speech (TTS) or by visual display on a screen.

The message processing system 100 may use the semantic description of a search matching message to summarize it when presenting it to the user so that the message content can be presented in a fraction of the time it would take to read/display the entire message. This can be used for browsing the message history 105 as well as when multiple parallel chats or high-stress traffic demand a low-cognitive-load presentation of the match message.

The message processing system 100 expects a connected or partially connected scenario (connection is needed to pass the messages). Voice recognition can be done on a remote server, on local hardware installed in the car, or both. For example, a typical embodiment may be based on a distributed, hybrid on/offboard processing arrangement. "Onboard" in the sense of using computer hardware that's locally available in the vehicle, for example, on a user cell phone or other device in the user's proximity. "Offboard" would be on a remote large server computer hosting the messaging and dictation application. Thus the various specific processing modules relevant to speech and language processing—command-and-control speech recognition, dictation speech recognition, user profile (message history), annotation module, message search module, etc.—all can be run either onboard, offboard, or both by either distributing the processes across the two platforms, or running them in parallel on both platforms and having an arbitration module to come to a unified solution.

Only minimal setup may be needed which only uses speech input and output channels for communication between the user and the system. The voice communication may usefully be supplemented by additional controls, for example, buttons, touch screens, jog dials, etc. as well as various different mode output devices (e.g., display screens) so long as care is taken to not compromise safety.

Many of the aspects of mobile text processing systems may be user dependent and need data collection and configuration settings that are specific to the user. Such data can be stored in user profile records and they can be split further according to the messaging session counterpart, i.e. one sub-record per contact. The messaging session history allows for subsequent querying and other uses. Examples of user profile data include without limitation user preferences (preferred strategies and UI options), contact lists and information how often each contact is selected, message session history (dialog logs), personalized language models (LM) and language models for the particular contexts, and personalized acoustic models.

For automatic speech recognition (ASR), natural language understanding (NLU), automated dialog systems, and data access, generic factory language models (LM) have an unnecessarily high perplexity to recognize speech from a given speaker, lowering recognition accuracy. Using generic factory LMs also increases dialog length and lowers user acceptance of the human machine interface (HMI). To improve automatic speech recognition (ASR) accuracy, a particular user's language model (LM) can be customized by adaptive retraining using the annotated messages in the user message history. The LM training uses semantically annotated textual messages that closely match the choice of words and phrases of the user and also the situational meta-data. A training corpus assembly tool can spider through one or more information sources (e.g. the Internet or existing message logs from all users on the ASR server) and identify texts in the information source within a small semantic distance to the messages in the history of the specific user. The identified texts can then be used to retrain/prune the user's LM. The LMs can be updated on a remote server for off-board processing and/or onboard.

The LM is adapted based on the message session context to reflect the frequency of individual words appearing in the textual messages. The system collects the history of message sessions with particular users and adapts the language model based on the collected data. One or more of the following phenomena may be taken into account while adapting the language model:

- Each user uses a specific limited vocabulary and favors some words. Using word frequency counting (n-gram), frequently occurring words can be identified and their probability of recognition boosted.
- The vocabulary of sent messages depends on the message session counterpart. Different models may be used for message sessions with parents, friends or colleagues. An initial LM can be selected based on auxiliary information about the user which is part of the profile or relevant social network profiles (sex, age, nationality, languages, school).
- There is a high probability that words appearing in a previous message session will appear in responses.
- Some words/n-grams occur frequently in responses to certain types of messages.
- Local geographical terms are more expected than others (name of streets, city names ... ).
- Semantic understanding of the message session can help narrow the list of expected phrases.

The process of language model adaptation starts with an initial, generic model that is adapted more and more as data from a particular user is recorded.

Adaptation of the language model can be considered as a two part process: (1) analyzing the data and computing/adapting the LM, and (2) applying the LM. Starting with the first of these, the language model can be adapted during the message session (e.g. after one message, after one sentence, or possibly in shorter intervals) and/or offline after a message session. The language model can be adapted on-board (in the car, on the device) and/or off-board (on an ASR server). Standard statistical and machine learning methods can be used (n-grams, information retrieval techniques) to predict words that would likely occur in response to a particular message or message thread. This can be initially learned from corpora such as the Enron email corpus (using threads of short emails) and then adapted on user's personal messaging data as more data becomes available in the personal user message history. Semantic analysis can be used (e.g. parsing rules written for a selected domain or a generic syntactic parser and rules on top of parsed structures) to predict words that may be included in response. Salient words can be identified as described above and relevant n-grams can be looked up in a background corpus and those can be added to the language model. Alternatively, the salient words can be used to find texts in the same domain on the web or in other corpora, which can then be added to the LM training corpus. Geographic and time information also can be used to boost certain LM items, e.g. statistics related to winter sports when driving in the mountains in the wintertime. The LM can be modified and personalized based on message session counterpart (given all messages sent to the counterpart). Initially, when there are no previously sent messages to the selected counterpart, LM configuration can be estimated by using configurations for counterparts of similar age/sex/language.

Once a semantic fingerprint of a message or set of message including word field, geographical, time information, etc. has been defined, then a large background corpus can be spidered to identify other similar texts that can then be used as a training corpus for the updated LM. In the case of automotive or mobile server-based recognition, this background corpus can be the set of all previously recognized utterances on the ASR server, either adding matching utterance transcripts that were prepared manually, or by bootstrapping ASR results and including those with sufficiently high ASR confidence and semantic match.

Once the LM has been adapted, it can be applied during speech recognition in the ASR search (e.g. an SLM or a weighted grammar) and/or in a separate post-processor that re-ranks ASR hypotheses. Re-ranking hypotheses can be done based on n-grams as well or by comparing word and phrase hypotheses to the vocabulary used in previous messages of the same message session. Adapting the language modeling during the message session may be implemented with a post-processor LM, whereas the ASR search language model may be modified offline.

An embodiment of the present invention thus provides a set of user functions to permit voice search in past messaging sessions. Examples of user-system dialogs may include:

U: When was the last time I talked to Tomas?
[system looks up information in the meta-information part of the chat log]
S: Today at 3 p.m.
U: Summarize my last message session with Tomas.
[system looks up information in the semantics part of the chat log, reads the most important salient words]
S: Robot convention, Prague Boston, November.
U: Who did I chat with lately about the robot conference in the Czech Republic?
[requested search terms "conference" and "Czech Republic" are not part of the message session, but were identified in the 1st level word field associations of the chat log which contained words "Prague" and "convention"]
S: With Tomas on August 8.
U: Who did I talk with when I was in the traffic jam, driving to Merelbeke last February?
[system looks up information in the meta-information—navigation info part of the chat log]
S: With Tomas, on August 8.

Embodiments also may support queries about users and status:

U: Chat with Martin.
S: Do you mean Martin Hill or Martin Walker?
U: Martin Hill.
U: Is John online?
U: I need somebody from IBM.
S: I found 3 IBM contacts: . . . .

Entire message sessions and/or individual messages can be summarized, either automatically under the control of the system software, or upon user request. An example user-system dialog for message summarizing functionality might go along the lines of:

U: What was my last message session with Tomas about?
S: Robot, convention, Prague Or, related to searching message summaries, e.g. to find out with whom a topic was discussed most often:

U: Who did I chat with most about Project X?
S: With Tomas.

Or when the system automatically decides that a message doesn't get uttered completely but only in summary form—e.g., based on the driving situation or when multiple chat rooms are active at the same time—a system dialog may automatically summarize a new incoming chat message:

S: You have new chat from John. You last chatted yesterday and discussed X.

Embodiments of the invention may be implemented in whole or in part in any conventional computer programming language. For example, preferred embodiments may be implemented in a procedural programming language (e.g., "C") or an object oriented programming language (e.g., "C++", Python). Alternative embodiments of the invention may be implemented as pre-programmed hardware elements, other related components, or as a combination of hardware and software components.

Embodiments can be implemented in whole or in part as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

Although various exemplary embodiments of the invention have been disclosed, it should be apparent to those skilled in the art that various changes and modifications can be made which will achieve some of the advantages of the invention without departing from the true scope of the invention. For example, an embodiment can be used by itself in a stand-alone arrangement that only provides text messaging functionality, or alternatively, it may be a sub-part of a larger more complex system that provides text messaging as just one of its functions.

What is claimed is:

1. A textual message processing system for use in a mobile environment, the system comprising:
   a user messaging application for processing at least one user textual message during a user messaging session;
   a semantic annotation module for:
      a. identifying one or more semantically salient terms in the user textual message, and
      b. annotating the user textual message with annotation terms having a low semantic distance to the semantically salient terms;
   a user message history for storing the annotated textual messages; and
   a message search module for using one or more keywords to search the user message history including the annotation terms, and identifying as a search match any annotated textual messages within a semantic distance threshold of the one or more keywords.

2. A system according to claim 1, wherein the semantic annotation module further annotates the user textual message with situational meta-data characterizing the user textual message.

3. A system according to claim 2, wherein the situational meta-data includes at least one of time data, location data, activity data, and user-specific terms associated with the user textual message.

4. A system according to claim 1, further comprising: a user interface for presenting the search match textual messages to a user with the annotation terms.

5. A system according to claim 4, wherein the user interface uses a text-to-speech arrangement for presenting the search match textual messages to the user.

6. A system according to claim 1, wherein the message search module obtains the keywords based on a hands-free, eyes-free user interface.

7. A system according to claim 1, wherein the user textual message includes instant messaging text.

8. A system according to claim 1, wherein the user textual message includes automatic speech recognition text dictated via automatic speech recognition.

9. A system according to claim 8, further comprising: a speech recognition language model adapted to the annotated textual messages in the user message history.

10. A method of processing textual messages in a mobile environment, the method comprising:
   processing a user textual message during a user messaging session;
   identifying semantically salient terms in the user textual message;
   annotating the user textual message with annotation terms having a low semantic distance to the semantically salient terms;
   adding the annotated textual message to a user message history;
   using one or more keywords to search the user message history including the annotation terms and identifying as a search match any annotated textual messages within a semantic distance threshold of the one or more keywords.

11. A method according to claim 10, further comprising: further annotating the user textual message with situational meta-data characterizing the user textual message.

12. A method according to claim 11, wherein the situational meta-data includes at least one of time data, location data, activity data, and user-specific terms associated with the user textual message.

13. A method according to claim 10, further comprising: presenting the search match textual messages to a user with the annotation terms.

14. A method according to claim 13, wherein a text-to-speech arrangement is used for presenting the search match textual messages to the user.

15. A method according to claim 10, wherein the keywords are obtained based on a hands-free, eyes-free user interface.

16. A method according to claim 10, wherein the user textual message includes instant messaging text.

17. A method according to claim 10, wherein the user textual message includes automatic speech recognition text dictated via automatic speech recognition.

18. A method according to claim 17, further comprising: adapting a speech recognition language model to the annotated textual messages in the user message history.

* * * * *